UNITED STATES PATENT OFFICE.

GEORGE MOORE, OF JOPLIN, MISSOURI.

FOOD PRODUCT AND PROCESS.

1,415,893.   Specification of Letters Patent.   Patented May 16, 1922.

No Drawing.   Application filed July 30, 1919. Serial No. 314,257.

*To all whom it may concern:*

Be it known that I, GEORGE MOORE, a citizen of the United States, residing at Joplin, in the county of Jasper and State of Missouri, have invented certain new and useful Improvements in Food Products and Processes; and I do hereby declare the following to be a full, clear, and exact description of the invention, such as will enable others skilled in the art to which it appertains to make and use the same.

This invention relates to improvements in the art of food preparation and the product thereof, and the primary object is the production of palatable food possessing both nourishing and laxative properties.

With this and further objects in view, as will in part hereinafter be stated and in part become apparent, the invention comprises certain novel combinations and arrangements of parts in a food product and certain novel steps in the assembly and formation thereof as will be hereinafter specified and claimed.

The product is a semi-confection laxative and when finished consists preferably, by dry measure, (that is, after deducting allowance for evaporation) of substantially sixty-three per cent syrup, twelve per cent peanut butter, and twenty-five per cent of bran, preferably wheat bran, with sufficient salt for seasoning, and the final product being preferably coated with chocolate for flavoring and for preventing the product from becoming unduly dry. Brown sugar may be substituted for some of the syrup, approximately up to one-half thereof. Other nut meats may be added, such as Brazil or walnuts, or in part substituted for a portion of the peanut meat. The bran may be supplied by utilizing the whole of the wheat crushed or ground, but when the bran is provided in this form substantially the same relative quantity with respect to the proportions of the other parts given is maintained without reference to the amount of added substance represented by the kernel of the wheat, the kernel giving a pleasing flavor and nutritive value to the product.

The process of producing this product is carried out preferably by boiling the syrup (appropriately flavored with salt) to a point where it will form a soft consistent mass on cooling. Before cooling the peanut butter is added and thoroughly stirred throughout all parts of the syrup, and then the bran is added and similarly stirred, before the mass cools. The product is then pressed into moulds to cool, and the separate blocks or tablets thus formed are subsequently dipped in melted chocolate for providing the desired chocolate coating. Before these steps of the process are begun, a supply of peanut butter is prepared by pulverizing the peanuts and mixing them with a little water so that they will be capable of more thorough intermixing with the syrup.

The result of the process is a semi-confection possessing nutritive value, a very pleasing taste, and the laxative properties known to be possessed by bran.

The peanut butter serves to coat the particles of bran sufficiently not to be entirely dissolved therefrom by the saliva, and the product is, therefore, swallowed by the consumer without the well known objectionable taste or feel of the bran and without its usual dryness.

What I claim is:—

1. A semi-confection product comprising a sweetening element, peanut meat, and bran in such proportion that the quantity of bran is sufficiently great for therapeutical action and is less than forty per cent of the product.

2. A semi-confection product comprising a sweetening element, peanut meat, and bran, the bran being in quantity bearing a proportion to the whole product of substantially twenty-five per cent.

3. A food product comprising peanut butter and bran, the bran being in a quantity sufficient for therapeutical action and less than forty per cent of the whole product, and the peanut butter containing the natural oil of the nuts.

4. In the art of forming a food product, boiling syrup to a point where it will form a soft consistent mass upon cooling, thoroughly stirring in peanut butter before the syrup is cool, and then thoroughly mixing bran into the mass before cooling.

5. In the art of forming a food product, preparing peanut meat by pulverizing the nuts and mixing them with a little water, then boiling syrup to a point where it will form a soft consistent mass upon cooling, stirring into the syrup before cooling the prepared peanut meat, and mixing bran in the mass before cooling.

In testimony whereof I affix my signature in presence of two witnesses.

GEORGE MOORE.

Witnesses:
EDYTHE C. KEENE,
L. H. MOORE.